United States Patent
Gautsch et al.

(10) Patent No.: US 11,821,856 B2
(45) Date of Patent: Nov. 21, 2023

(54) X-RAY EXAMINATION DEVICE (71) Applicant: Anton Paar GmbH, Graz (AT)

(72) Inventors: Josef Gautsch, Graz (AT); Helmut Gartler, Premstätten (AT)

(73) Assignee: Anton Paar GmbH, Graz (AT)

(*) Notice: Subject to any disclaimer, the term of this patent is extended or adjusted under 35 U.S.C. 154(b) by 0 days.

(21) Appl. No.: 17/804,048

(22) Filed: May 25, 2022

(65) Prior Publication Data
US 2022/0381712 A1 Dec. 1, 2022

(30) Foreign Application Priority Data

May 27, 2021 (AT) .............................. A 50424/2021

(51) Int. Cl.
*G01N 23/20* (2018.01)
*G01N 23/201* (2018.01)
*G01N 23/207* (2018.01)
*G01N 23/22* (2018.01)
*G01N 23/2206* (2018.01)
(Continued)

(52) U.S. Cl.
CPC ... *G01N 23/2206* (2013.01); *G01N 23/20016* (2013.01); *G01N 23/20025* (2013.01); *G01N 23/201* (2013.01); *G01N 23/207* (2013.01); *G01N 2223/045* (2013.01);
(Continued)

(58) Field of Classification Search
CPC ....... G01N 23/20016; G01N 23/20025; G01N 23/201; G01N 23/207; G01N 23/2206; G01N 2223/045; G01N 2223/05; G01N 2223/071; G01N 2223/30; G01N 2223/317
See application file for complete search history.

(56) References Cited

U.S. PATENT DOCUMENTS 3,105,902 A 10/1963 Ostrofsky et al.
4,263,510 A 4/1981 Ciccarelli et al.
(Continued)

FOREIGN PATENT DOCUMENTS

EP 1 359 405 A1 11/2003
JP H03-216539 A 9/1991
WO WO 01/46677 A2 6/2001

OTHER PUBLICATIONS

Corresponding AT 50424/2021 Office Action, dated Mar. 11, 2022, 4 pages.
(Continued)

*Primary Examiner* — Mark R Gaworecki
(74) *Attorney, Agent, or Firm* — Lewis Roca Rothgerber Christie LLP (57) ABSTRACT

A device for examining a sample by X-radiation having a radiation generation system for generating primary radiation, a first goniometer arm on which the radiation generation system is mounted and which is pivotable about a goniometer axis, a detection system configured to detect secondary radiation emanating from the sample, a second goniometer arm on which the detection system is mounted and which is pivotable about the goniometer axis, and an evacuable sample chamber within which the sample is arrangeable in a sample region encompassing a portion of the goniometer axis, the sample chamber being delimited by a sample chamber wall which has a transmission region which is transmissive to the primary radiation and is vacuum-tight, in order to allow the primary radiation to penetrate into the sample chamber and to impinge on the sample region at different angles of incidence.

20 Claims, 3 Drawing Sheets

(51) Int. Cl.
*G01N 23/20016* (2018.01)
*G01N 23/20025* (2018.01)

(52) U.S. Cl.
CPC ... *G01N 2223/05* (2013.01); *G01N 2223/071* (2013.01); *G01N 2223/30* (2013.01); *G01N 2223/317* (2013.01)

(56) References Cited

U.S. PATENT DOCUMENTS

2008/0175352 A1  7/2008  Kogan
2017/0356862 A1  12/2017  Hammerschmid et al.

OTHER PUBLICATIONS

European Search Report for Application No. 22175465.8, dated Sep. 29, 2022, 11 pages.

X-RAY EXAMINATION DEVICE

This application claims priority to Austrian Patent Application No. A50424/2021 filed 27 May 2021, the disclosure of which is hereby incorporated herein by reference.

TECHNICAL AREA

Embodiments of the present invention relate to a device for examining a sample by means of X-radiation (X-rays), and further relates to a method of manufacturing a device for examining a sample by means of X-radiation.

BACKGROUND OF THE INVENTION

Apparatus for examining various samples by means of X-radiation is known from the prior art.

Document U.S. Pat. No. 4,263,510 discloses a combined X-ray diffraction and fluorescence spectroscopy apparatus with an environmentally controllable chamber. Use of an environmentally controllable chamber can increase sensitivity so that elements with low atomic numbers can be measured in an improved manner. The apparatus has a relatively high number of sealing elements and has a high complexity. Furthermore, the range of measurable scattering angles is limited.

Document US 2017/0356862 A1 discloses a measurement chamber for a compact goniometer in an X-ray spectrometer. A first goniometer arm holds an analyzer crystal and a second goniometer arm holds an X-ray detector. The measurement chamber includes an entrance opening for entry of X-ray fluorescence radiation into the measurement chamber. The measurement chamber is characterized by having a bearing block for receiving and holding both goniometer arms in a concentric and rotatable manner. However, the device is very bulky and both the detector and the sample rotate during a measurement. For certain types of samples, however, rotation of the sample during measurement is disadvantageous and can distort measurement results.

Thus, there may be a need to provide a device for examining a sample by means of X-radiation, wherein the measurable scattering angle range is relatively large or sufficiently large, wherein the device is compact and, in particular, is composed of few parts, and further allows to measure different sample types in a reliable manner.

There may also be a need to provide an X-ray diffractometer having an easily exchangeable vacuum chamber.

SUMMARY OF THE INVENTION

This need may be met by the subject matter of the independent claims, wherein one independent claim is directed to the device and another independent claim is directed to a manufacturing method for manufacturing the device for examining a sample by means of X-radiation. The dependent claims specify particular embodiments of the present invention.

According to an embodiment of the present invention, there is provided a device for examining a sample by means of X-radiation, comprising a radiation generation system (radiation generating system) for generating primary radiation; a first goniometer arm on which the radiation generation system is mounted and which is pivotable about a goniometer axis; a detection system configured to detect secondary radiation emanating from the sample; a second goniometer arm on which the detection system is mounted and which is pivotable about the goniometer axis; an evacuable sample chamber within which the sample is arrangeable (can be arranged) in a sample region (sample area) encompassing a portion of the goniometer axis, the sample chamber being delimited by a sample chamber wall which has a transmission region (transmission area) that is transmissive (transparent) to the primary radiation and vacuum-tight in order to allow the primary radiation to penetrate into (to enter) the sample chamber and to impinge on the sample region at different angles of incidence. In this regard, the sample chamber has a first opening in a detection beam path at which the sample chamber and the detection system are connectable (can be connected) in a vacuum-tight manner so that the detection beam path is evacuable (can be evacuated).

The radiation generation system may have an X-ray tube, wherein electrodes (electrons) emerge from a spiral-wound filament (cathode) and impinge on an anode embodied as a metal block. Braking radiation may be generated due to the deceleration of the electrodes (electrons). Furthermore, electrodes (electrons) can be knocked out of the shells of the metal atoms by electrode impacts (electron impacts). Electrons from higher atomic shells fall back into the lower energy shells, thereby emitting characteristic X-radiation. For example, the anode may have molybdenum, copper, tungsten, cobalt, chromium, or a combination thereof. In particular, the primary radiation may include characteristic copper lines, in particular, copper Kα-radiation, cobalt Kα-radiation, or chromium Kα-radiation. The wavelength of the primary radiation may be, for example, between 10 nm and 5 μm. The energy of the primary radiation may be, for example, between 1 keV to 50 keV.

The radiation generation system may include beam shaping optics and/or one or more filters. The radiation generation system may be configured to generate a beam of primary radiation of a desired cross-sectional size, cross-sectional profile, and/or wavelength or range of wavelengths.

In particular, the radiation generation system can be operated under ambient pressure, i.e. normal atmospheric pressure, thus operating in a pressure range e.g. between 950 mbar and 1050 mbar. The radiation generation system may be mounted on the first goniometer in such a way that the generated primary radiation is directed to the sample region within the goniometer axis for each set pivoting angle. Thus, different angles of incidence of the primary radiation can be set (adjusted) on a sample that can be located in the sample region (encompassing a region of the goniometer axis).

The secondary radiation may have substantially the same wavelength or range of wavelengths as the primary radiation, may thus be formed in particular by elastic interaction of the primary radiation with the sample, and may thus comprise scattered radiation, in particular elastic scattered radiation. In other embodiments, the secondary radiation may have different wavelengths or different wavelength ranges or a different wavelength range than that characterizing the primary radiation. For example, X-ray fluorescence may be excited by irradiating the sample with the primary radiation, such that the secondary radiation comprises, at least in part, fluorescent radiation that may emanate from, or is irradiated by, a sample.

In the simplest case, the detection system can be implemented, for example, by a point detector or also by two-dimensional or three-dimensional arrays of detection elements, which can be read out individually. By pivoting the second goniometer, the detection system is pivotable in such a way that secondary radiation originating from the sample region and emerging at different emergent angles can be detected by means of the detection system. Thus, the device allows to set an angle of incidence of primary radiation impinging on the sample in a certain range and may further allow to detect secondary radiation emerging from the sample region in a certain range of emergent angles.

The sample chamber is evacuable in the sense that a pressure can be achieved within the sample chamber which is lower than an ambient pressure or atmospheric pressure, in particular a pressure of, for example, less than 100 mbar or less than 50 mbar or less than 30 mbar or even less than 10 mbar. The decreased pressure within the sample chamber corresponds to a decreased air density relative to an atmospheric air density. Due to the lowered air density, absorption of X-radiation or secondary radiation emanating from the sample and falling into the detection system for detection is reduced. In particular, a vacuum may exist along the entire detection beam path, i.e., between the sample located in the sample region and a sensor or a detection element of the detection system, the vacuum being substantially equal to or similar to the vacuum within the sample chamber. Due to the reduced absorption of secondary radiation thus achieved, a measurement sensitivity of the device may be improved compared to the prior art.

The device may further comprise an adjustment system to spatially arrange the sample (which is, for example, received in or held by means of a sample holder) in a predetermined or desired manner relative to the goniometer axis or the sample region. For example, a surface of the sample or a central region of the sample may be adjusted so that the surface region or the central region of the sample comes to rest in a portion of the goniometer axis. On this portion of the goniometer axis (in particular sample region) the primary radiation may also be directed for all different angles of incidence. Likewise, for all different pivoting angles of the detection system, the secondary radiation emanating or originating from this portion of the goniometer axis may be detectable by the detection system.

The sample chamber may have a sample interior in which the sample is located (arranged) during measurement. The sample may have a fixed position during the measurement and may be fixed or held to a base component (e.g. via a sample holder receptacle and/or sample holder). The sample chamber may be movable relative to the base component and/or the sample holder receptacle and/or the sample holder, in particular it may be rotatable, in particular it may be rotatable about the goniometer axis. In order to be able to set a desired emergent angle for detection, the sample chamber may be pivoted together with the detection system. The sample chamber may thus be pivoted or rotated synchronously with the detection system when the latter is connected to the sample chamber. When the detection system is pivoted by pivoting the second goniometer arm (e.g., by means of a motor or actuator), a torque may be applied to the sample chamber via a connection system to pivot the sample chamber substantially synchronously with the detection system.

Both the radiation generation system and the detection system may be configured to adjust a desired angle of incidence and/or emergent angle in a highly precise manner by means of goniometer arms mounted in high-precision bearings. For example, an angle of incidence and/or emergent angle may be adjustable with an accuracy of, for example, $1/100$ degree or better than $1/100$ degree or $1/1000$ degree or better than $1/1000$ degree or $1/1000$ degree to $1/10,000$ degree.

During a measurement, the sample chamber may be pivoted about the goniometer axis, which can be arranged in particular concentrically to a second opening described in detail below. Although it is particularly advantageous to perform a measurement with a sample located within the sample chamber and with the sample chamber evacuated, a measurement can also be performed without a sample chamber in certain cases. In this case, the detection beam path does not necessarily have to be evacuated.

The sample chamber or the sample chamber wall may be substantially made of metal, e.g., steel. The transmission region may allow primary radiation generated outside the sample chamber to be incident on an interior of the sample chamber, in particular allow the primary radiation to be incident on or impinge on the sample region inside the sample chamber at different angles of incidence. The transmission region may be made of one or more materials that are transmissive to, or provide low attenuation of, the primary radiation. Transmissive to primary radiation may mean that, for example, between 50% and 80% of an intensity upstream of the transmission region can pass to downstream of the transmission region. The transmission region may be substantially impervious to air and sealed to, for example, other materials of the sample chamber wall by means of sealing elements, for example, elastic sealing elements such as rubber seals (gaskets). The sample chamber may optionally also include a viewing window, for example, on a front face, which allows a user to inspect the sample region or sample within the sample chamber. The sample chamber may also include a door, for example, to allow the sample to be inserted into the sample chamber. Thus, a compact device may be provided, whereby a measurement of a sample by means of X-radiation may be performed with high sensitivity and over a wide range of scattering angles.

According to an embodiment of the present invention, the device further comprises a connection system configured for releasably (detachably) connecting the sample chamber to the detection system at the first opening in a vacuum-tight, in particular elastic or rigid, manner, wherein the connection system comprises at least a first sealing element (sealing member), wherein the first opening is in particular circular or rectangular.

The detachable connection by means of the connection system makes it possible to separate the sample chamber from the detection system. Thus, it may also be possible for the sample chamber to be removed so that, for example, the sample region may also be exposed to ambient pressure. The connection system may comprise one or more parts. For example, the connection system may comprise a vacuum flange and/or other elements.

Also, when the sample chamber is connected to the detection system by means of the connection system, some flexibility or mobility of the sample chamber relative to the detection system may be enabled, while, however, a vacuum-tight connection may be ensured. Due to the (slight) relative mobility of the detection system relative to the sample chamber, an overdetermination of the mechanical system may be avoided, in particular if the detection system is characterized by a high-precision bearing or highly accurate mobility or pivotability by means of the second goniometer arm. Despite an elastic connection between the sample chamber and the detection system, a sufficient torque may be applied to the sample chamber when the detection system is pivoted, so that the sample chamber is rotated or pivoted synchronously with the detection system when the detection system is pivoted.

The first sealing element may include one or more seals to provide a vacuum-tight connection.

At the first opening, for example, a vacuum flange may be rigidly connected or an (elastically connected) sleeve with a flange may be provided. At the flange, for example, the detection system may be elastically or vacuum-tightly connected. The connection system may, for example, have substantially cylindrical symmetry. The connection system may be arranged such that the secondary radiation can propagate along a longitudinal axis of the connection system, namely to the outside of the sample chamber onto a sensor element of the detection system.

According to an embodiment of the present invention, the connection system has an external thread and a union nut (coupling nut), wherein the at least one first sealing element has an annular seal made of elastic material that is compressible by means of the union nut for sealing, in particular between opposing end faces.

The external thread may be an element of the detection system or may be an element of, for example, a sleeve (or a flange), which may be arranged inside the first opening and may be arranged in a vacuum-tight manner. The union nut may also either be an element of the detection system or may be an element of, for example, the aforementioned sleeve (or a flange). The external thread together with the union nut may, for example, be designed as a bayonet lock. For this purpose, the external thread may have a special thread of a bayonet lock. By screwing the union nut onto the external thread, the detection system can be connected to the sample chamber in a detachable and simultaneously vacuum-tight manner. The annular seal of the first sealing element may, for example, be arranged between an end face of an element of the detection system and an end face of a vacuum flange, for example, or a sleeve and compressed together to ensure a seal.

This allows the sample chamber to be releasably connected to the detection system in a simple and cost-effective manner.

According to an embodiment of the present invention, the connection system comprises a sleeve arranged within the first opening, wherein the at least one first sealing element comprises a further annular seal of elastic material arranged between an inner surface of a region (portion) of the sample chamber wall delimiting (defining) the first opening and an outer surface region of the sleeve, the sleeve being connected to the detection system in particular by means of the union nut screwed onto the external thread.

The sample chamber and the detection system may also be connectable or connected, for example, by screwing flange elements together.

A longitudinal axis or an axis of the sleeve may substantially correspond to a propagation direction of the secondary radiation detected by means of the detector when a certain emergent angle is set. The further annular seal between the inner surface of a region of the sample chamber wall delimiting the first opening and an outer surface area of the sleeve may provide a vacuum-tight connection, but may allow some relative mobility or elasticity or tolerance between the sample chamber and the detection system. This may allow tolerance compensation to limit in particular mechanical loads.

The annular seal of the first sealing element may enable a mobility tolerance substantially in the axial direction of the sleeve. The further annular seal of the first sealing element, on the other hand, may allow a mobility tolerance between the detection system and the sample chamber in a direction perpendicular to the axial direction of the sleeve, in particular in a direction in which a torque acts when the detector is pivoted to change the recordable emergent angle, resulting in a substantially synchronous entrainment of the sample chamber.

According to an embodiment of the present invention, the transmission region has an aperture angle of between 0° to 165°, in particular between 100° to 165°, further in particular between 120° to 165°, still further in particular between 140° to 165°, and/or wherein the transmission region is made of material transmissive to X-radiation, in particular comprising plastic and/or beryllium and/or light metal and/or graphite and/or aluminum, wherein the transmission region is formed, in particular, as a segment of a cylindrical surface (shell), with a cylinder symmetry axis (cylindrical axis of symmetry) lying substantially in the goniometer axis.

The aperture angle of the transmission region may measure the angular extent of the transmission region, in particular the angular extent of the transmission region with respect to the goniometer axis. For example, if it is measured in a Bragg-Brentano geometry, the aperture angle of the transmission region may be, for example, twice the maximum angle of incidence, which may also be twice the maximum emergent angle. In the Bragg-Brentano geometry, both the radiation generation system and the detection system are pivoted in opposite directions by the same angle from a zero position.

The transmission region may, for example, be formed as an arc segment, wherein the arc segment has an angular extent of, for example, between 0° to 165°, in particular 100° to 165°. With an angular extent (or aperture angle) of 140°, for example, an angle of incidence of 70° and also an emergent angle of 70° can be achieved in the Bragg-Brentano geometry. If the angular extent or the aperture angle is even 165°, then, for example, in the Bragg-Brentano geometry, an angle of incidence of 82.5° and also an emergent angle of 82.5° can be achieved. This enables an accurate measurement of the sample.

The transmission region may be made of a different material than other parts of the sample chamber wall, which may be made of steel, for example. Sealing elements, e.g. in the form of sealing lips, may be provided between the material of the transmission region and the material of the sample chamber wall.

According to an embodiment of the present invention, the device comprises at least one of the following: a sample holder receptacle, in particular adjustable in height, configured to receive a sample holder; and/or a sample holder, supportable by means of the sample holder receptacle or a fixed base component and which is configured and arranged to hold the sample in the sample region.

The sample holder receptacle may be configured to receive various types of sample holders to hold them, in turn, in a fixed position and orientation during measurement. The sample holder receptacle may have a longitudinal axis that is substantially along or collinear with the goniometer axis. A longitudinal direction of the sample holder receptacle may be finely adjustable in position and/or coarsely adjustable, for example, to adjust a height or to allow adjustment in a different lateral direction. In turn, the sample holder receptacle may be a part of a base component or may be mounted to a base component, in particular a fixed base component.

One or more sample holders may be provided, in particular to support different types of samples. For example, the sample holder may comprise a capillary to contain a liquid sample. The sample may be a solid, a powder, polycrystalline, crystalline, may comprise a liquid, and/or may comprise a single crystal. The sample holder itself may or may not be adjustable in height or laterally. For example, the sample holder may comprise a sample container (for example, for a liquid and/or a powder) or may comprise, for example, a substrate or a planar element on which a solid sample may be fixed. Thus, different sample types are supported. In particular, during measurement, the sample holder receptacle or the sample holder may be held in a fixed positioning and orientation.

According to an embodiment of the present invention, the sample chamber comprises a second opening through which a fixed base component and/or the sample holder receptacle and/or the sample holder extends at least partially, wherein the device further comprises at least one second sealing element, in particular annular, made of elastic material, arranged between an outer surface region of the base component and/or the sample holder receptacle and/or the sample holder and an inner surface region of the sample chamber wall delimiting the second opening for sealing, the sample chamber being in particular removable.

The sample chamber may be rotatably (and vacuum-tightly) connected to the fixed base component and/or the sample holder receptacle via the second opening. For example, a sample holder receptacle may protrude partially or completely into the sample chamber through the second opening such that the sample holder receptacle or the sample holder is arranged in the sample region, or such that the sample disposed on or in the sample holder is supported in the sample region.

The second sealing element may be arranged substantially concentrically to the goniometer axis and may enable a vacuum-tight connection between the base component and/or the sample holder receptacle and/or sample holder on the one hand and the vacuum chamber on the other hand, whereby a rotatable connection or coupling between the sample chamber on the one hand and the base component and/or the sample holder receptacle and/or the sample holder is achieved. When the sample chamber is pivoted, friction occurs between the inner surface region of the sample chamber wall delimiting the second opening and an outer surface of the second sealing element. For example, a lubricant, such as vacuum-compatible grease, may be provided in a contact region to reduce frictional resistance or also reduce abrasion. The second sealing element may provide a vacuum-tight connection and further provide rotatability of the sample chamber relative to the base component. The sample chamber may be removable, for example, to mount a sample holder or a sample on the sample holder receptacle or in the sample holder or on the sample holder.

The second opening may be circular for example. Likewise, the second sealing element may be circular and substantially concentric with the goniometer axis. This provides a seal against air ingress, or additionally allows the sample chamber to be rotated relative to the fixed base component.

According to an embodiment of the present invention, the annular seal and/or the further annular seal of the at least one first sealing element and/or the second sealing element is concentrically arranged and circular and/or comprises at least one of the following: a lip seal, an O-ring, a shaft seal, a sliding ring. In particular, the second sealing element may be arranged concentrically with respect to the goniometer axis. Thus, different types of sealing elements are supported, which can be selected according to specific requirements.

According to an embodiment of the present invention, the device further comprises a bearing configured to rotatably support the sample chamber relative to the sample holder receptacle and/or sample holder and/or a fixed base component, the bearing being exposed to ambient pressure, in particular outside the sample chamber.

The bearing may include, for example, a ball bearing, a slide bearing, a roller bearing, or a combination thereof. The bearing may hold the sample chamber in a defined geometric position and allow the sample chamber to be rotatable relative to the fixed base component. In other embodiments, the device does not need to include such a bearing. However, when a bearing is provided, a seal may be improved because the second sealing element is not used exclusively for the intended or desired guidance of the sample chamber. Rather, guidance of the pivoting of the sample chamber is provided by the bearing. In particular, the bearing may thus ensure that the sample chamber, or in particular the second opening, always remains positioned concentrically to the goniometer axis during the pivoting.

According to an embodiment of the present invention, the second sealing element is arranged between the bearing and a sample chamber interior. The bearing may thus be exposed to ambient pressure and be arranged outside the sample chamber. The bearing may be lubricated without contaminating or degrading the vacuum in the interior of the sample chamber. Thus, conventional bearings may also be supported.

According to an embodiment of the present invention, the device further comprises: a first actuator configured to pivot the radiation generation system by means of the first goniometer arm; a second actuator configured to pivot the detection system together with the sample chamber connected thereto by means of the second goniometer arm, wherein the first actuator and/or the second actuator is arranged outside the sample chamber.

The actuators may in particular comprise electric motors, which may for example also comprise a gearbox. The second actuator may be dimensioned in its applicable torque such that it is not only capable of pivoting the detection system by means of the goniometer arm, but also of pivoting the sample chamber connected thereto together with the detection system. The second actuator may exert a corresponding torque on the detection system via the goniometer arm, which detection system may exert a torque on the sample chamber due to the connection with the sample chamber, so that the sample chamber pivots or rotates synchronously with the detection system when the second actuator is controlled accordingly. If the actuators are arranged outside the sample chamber, they may be exposed to ambient pressure and thus may be of conventional design.

According to an embodiment of the present invention, the radiation generation system is pivotable from a zero position (0°) by means of pivoting the first goniometer arm by up to between 60° and 82.5°, in particular up to between 70° and 82.5°, from a zero position (0°) and/or wherein the detection system is pivotable by means of pivoting the second goniometer arm by up to between 60° and 82.5°, in particular up to 70° and 82.5°, from a zero position) (0°) opposite to a pivoting direction of the radiation generation system.

Thus, angles of incidence, for example, between 60° and 82.5°, and emergent angles, for example, between 60° and 82.5°, may be achieved so as to enable a comprehensive measurement of a sample. Conventional equipment for measuring samples by means of X-ray scattering can often only achieve smaller angles of incidence or emergent angles.

According to an embodiment of the present invention, the radiation generation system is located (arranged) outside the sample chamber and exposed to ambient pressure, and/or wherein the radiation generation system comprises a radiation source and optics to generate the primary radiation having a predetermined wavelength range and/or a predetermined cross-sectional size.

The radiation generation system may thus also be a conventional radiation generation system. The device may be configured to provide a certain wavelength range or a certain cross-sectional size and/or also cross-sectional profile of the primary radiation, as required. Thus, different measurement variants or measurement methods are supported.

According to an embodiment of the present invention, the device further comprises at least one vacuum port on the sample chamber and/or on the detection system and/or at least one vacuum pump configured to generate a pressure of less than 30 mbar within the sample chamber and/or the detection beam path.

Thus, evacuation of the interior of the sample chamber may be achieved in a reliable manner. By means of the vacuum pump, the pressure may reach, for example, between 2 mbar and 10 mbar inside the sample chamber or also between 1 mbar to 10 mbar. A diaphragm pump, for example, may be used as a vacuum pump.

A detector surface of one or more detector elements of the detection system may be evacuated as part of the detection beam path. In particular, no window must be provided in front of a detector area of the detection system. Electronics or evaluation or readout electronics of the detection system may also be evacuable.

According to an embodiment of the present invention, the detection system comprises detection optics and/or a filter and a detector, wherein the filter is arranged in the detection beam path, in particular at the first opening and/or the fastening element.

The filter may be provided, for example, to attenuate or substantially reduce in intensity unwanted wavelengths or radiation of unwanted wavelengths prior to impingement on a detection element or sensor element, for example, to between 0% and 10% of the intensity of the respective wavelength or length wavelength range impinging on the filter. The filter may also be exchangeable, for example, to allow for application-specific filtering. The filter may be located anywhere within the detection beam path, for example within the above-mentioned sleeve or in an input region of the detection system.

According to an embodiment of the present invention, the detector of the detection system comprises a two-dimensional or three-dimensional array of detector elements used as a point detection system or a line detection system.

The detector elements may have for example CCD detector elements and/or CMOS detector elements. An evaluation software or evaluation electronics may connect several detector elements or may be configured in such a way that intensity signals originating from several detector elements are calculated, for example, to determine an integral registered intensity.

According to an embodiment of the present invention, the device further comprises a controller communicatively connected to the radiation generation system and/or the first actuator and/or the detection system and/or the second actuator and/or the vacuum pump for performing a measurement in order to transmit control signals and/or receive measurement signals.

The controller may be implemented in software and/or hardware, for example. Different programs may be provided and exist in order to be able to carry out different measurement procedures.

According to an embodiment of the present invention, the device is configured to perform at least one of the following measurement procedures: X-ray diffraction (XRD), in particular in Bragg-Brentano geometry, X-ray fluorescence analysis (XRF), small angle X-ray scattering (SAXS), in each case in reflection and/or transmission, and/or wherein the goniometer axis is substantially horizontal or vertical, and/or wherein the sample comprises a powder and/or a crystal and/or many crystals and/or a liquid, and is immobile during the measurement, and/or wherein the sample chamber is substantially cylindrical.

Thus, comprehensive investigations on a variety of samples are possible. This enables, for example, elemental analysis or analysis of chemical compounds. The sample chamber, which may be substantially cylindrical, may have the cylinder axis arranged substantially on the goniometer axis. This allows the sample chamber to be manufactured in a simple manner.

It should be understood that features which have been mentioned, explained, provided or employed, alone or in any combination, in connection with a device for examining a sample by means of X-radiation, may likewise be applied, individually or in any combination, to an evacuable sample chamber for a device for examining a sample by means of X-radiation, and vice versa, according to embodiments of the present invention.

According to an embodiment of the present invention, an evacuable sample chamber for a device for examining a sample by means of X-radiation is provided. The sample chamber has a sample chamber wall delimiting a sample chamber interior within which the sample is arrangeable in a sample region, the sample chamber wall having a transmission region that is transmissive to the X-radiation and vacuum-tight to allow the X-radiation to penetrate into the sample chamber and impinge on the sample region at various angles of incidence. The sample chamber has a first opening, for example in a detection beam path, at which the sample chamber and a detection system are connectable in a vacuum-tight manner, in particular by means of a connection system comprising a first sealing element, so that the detection beam path is evacuable. The sample chamber has a second opening and, in particular, a second sealing element which is arrangeable at an inner surface region of the sample chamber wall delimiting the second opening for sealing. The transmission region has an aperture angle of between 100° to 165°, in particular between 120° to 165°, further in particular between 140° to 165°, wherein the transmission region is formed in particular as a segment of a cylindrical surface.

The invention will now be explained with reference to the accompanying drawings. The invention is not limited to the illustrated or described embodiments.

DETAILED DESCRIPTION

Figure 1A:
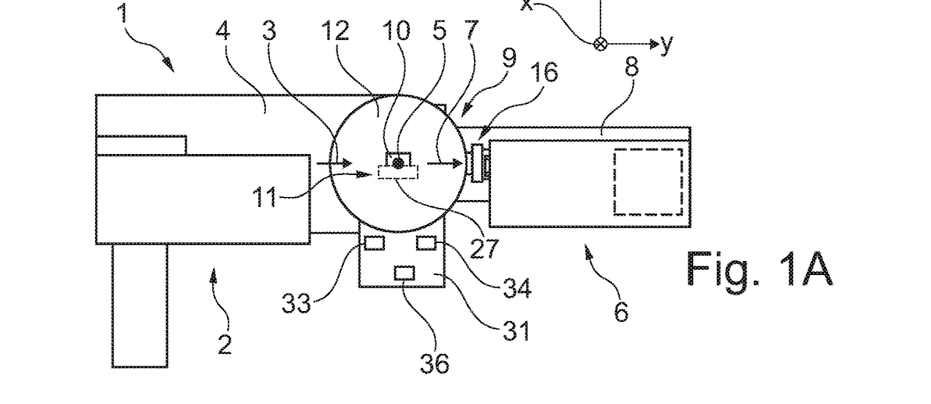
FIGS. 1A, 1B, 1C schematically illustrate a device for examining a sample using X-radiation according to an embodiment of the present invention in a reference configuration or zero configuration.
Figure 1B:
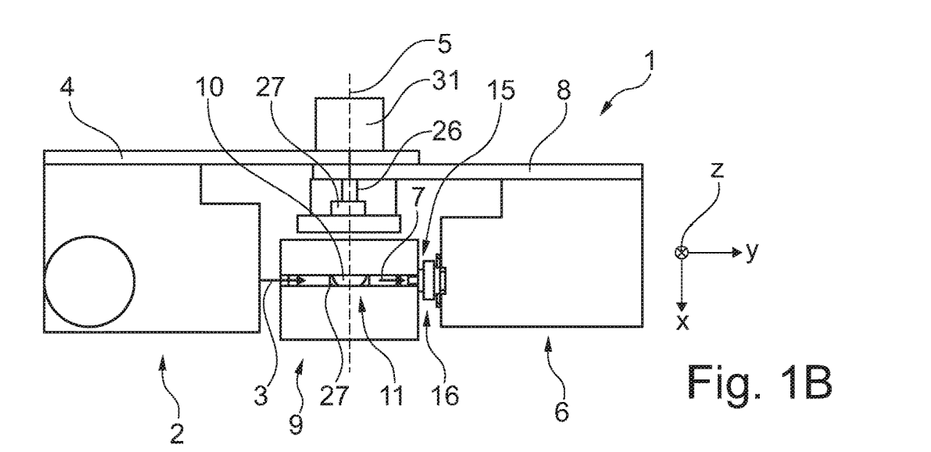
Figure 1C:
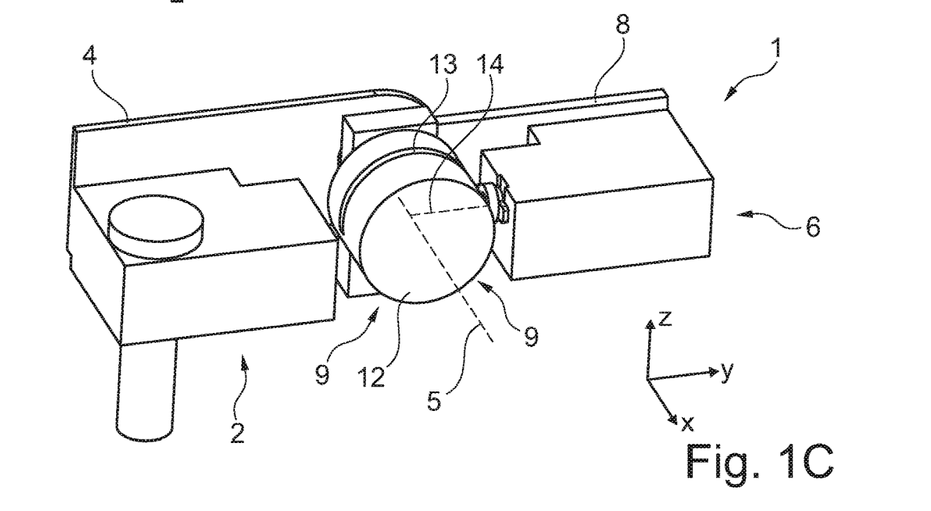
Figure 2A:
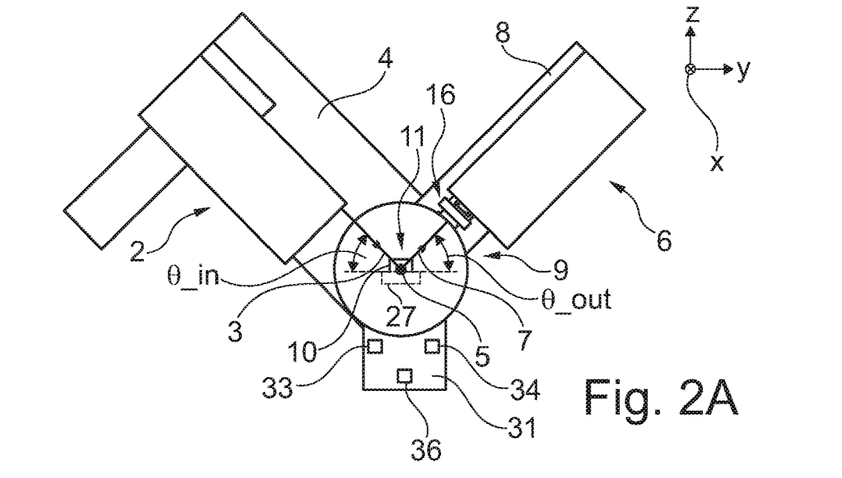
FIGS. 2A, 2B, 2C schematically illustrate the device illustrated in FIGS. 1A, 1B, 1C in another configuration during a measurement.
Figure 2B:
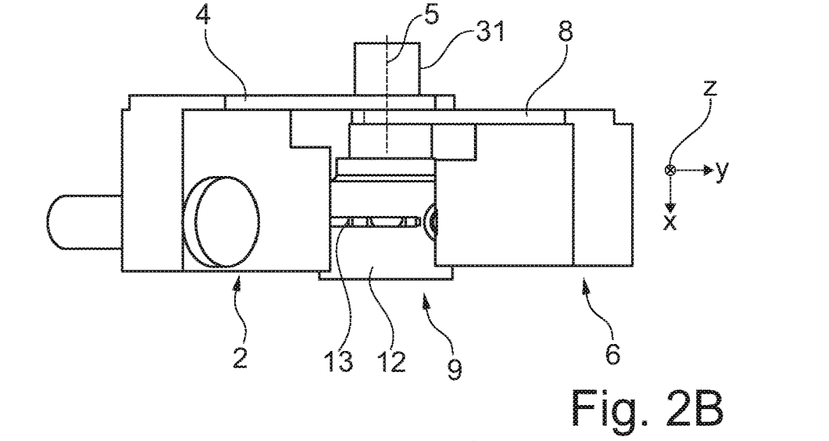
Figure 2C:
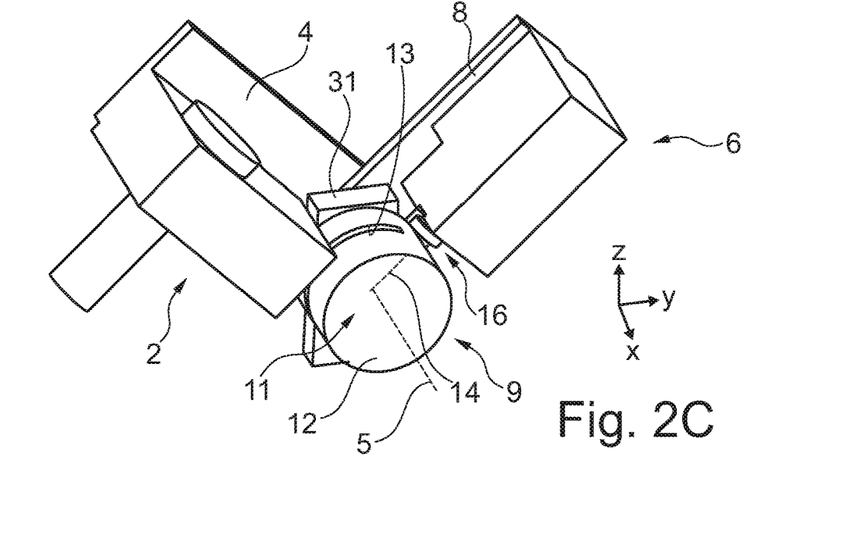

In FIGS. 1A, 2A, the device 1 for examining a sample by means of X-radiation according to an embodiment of the present invention is schematically illustrated in a side view along an x-axis of a coordinate system, in FIGS. 1B, 2B, the device 1 is schematically illustrated in a top view along the z-axis of the coordinate system, and in FIGS. 1C, 2C, the device 1 is schematically illustrated in a perspective three-dimensional view, in each case in two different measuring positions or measuring configurations.

The device 1 comprises a radiation generation system 2 for generating primary radiation 3. The device 1 further comprises a first goniometer arm 4 on which the radiation generation system 2 is mounted and which is pivotable about a goniometer axis 5. The device 1 further comprises a detection system 6 configured to detect secondary radiation 7 emanating from the sample. The device 1 further comprises a second goniometer arm 8 on which the detection system 6 is mounted and which is pivotable about the goniometer axis 5. The device 1 further comprises an evacuable sample chamber 9, within which a sample 10 is arrangeable in a sample region 11 encompassing a portion of the goniometer axis. In this regard, the sample chamber 9 is delimited by means of a sample chamber wall 12, the sample chamber wall 12 having a transmission region 13 that is transmissive and vacuum-tight to the primary radiation 3 to allow the primary radiation 3 to penetrate into the sample chamber 9 and impinge on the sample region 11 at various angles of incidence θ_in. In the reference configuration or reference position or zero position illustrated in FIGS. 1A, 1B, 1C, the angle of incidence θ_in=0°, while in the measurement configuration or measurement position illustrated in FIGS. 2A, 2B, 2C, the angle of incidence is non-zero and is approximately 45°.

The sample chamber 9 has a first opening 15 in a detection beam path 14, at which the sample chamber 9 and the detection system 6 is connectable in a vacuum-tight manner, so that the detection beam path 14 is evacuable. The device 1 further comprises a connection system 16, which is configured for a releasable vacuum-tight, in particular elastic, connection of the sample chamber 9 to the detection system 6 at the first opening 15.

Figure 4:
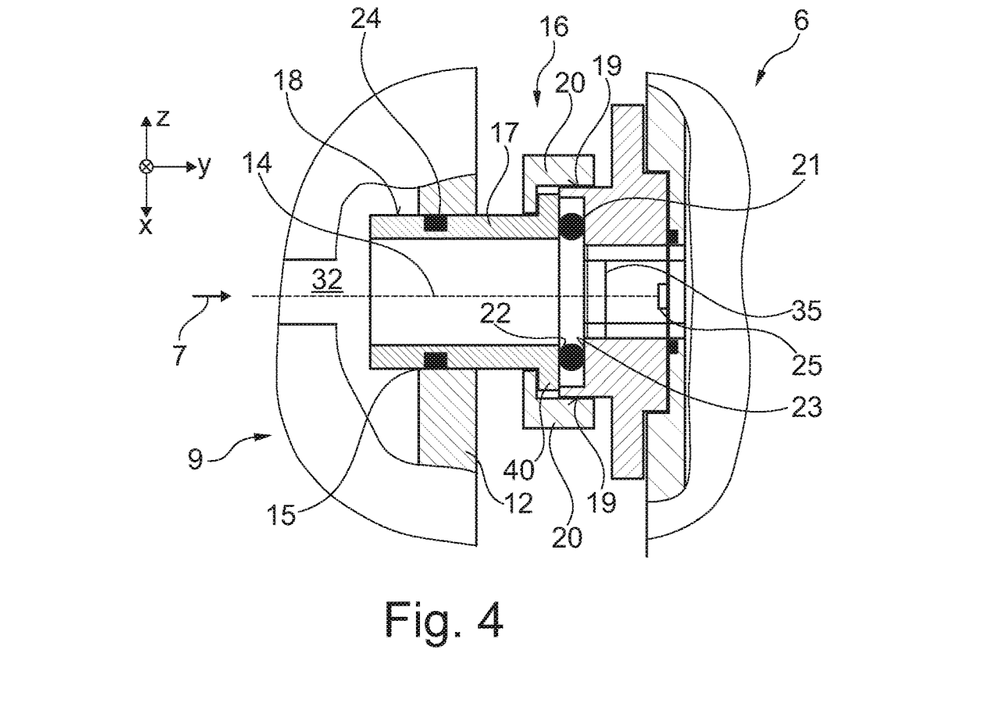
FIG. 4 schematically illustrates, in a sectional view, connecting elements for connecting a detection system to a sample chamber, as can be for used instance for the device illustrated in FIGS. 1A, 1B, 1C, 2A, 2B, 2C.

The connection system 16 is illustrated in greater detail in FIG. 4 in a sectional view through a Y-Z plane. Here, a part of the sample chamber 9 is illustrated on the left side of FIG. 4 and a part of the detection system 6 is illustrated on the right side.

The connection system 16 has an external thread 19 and a union nut 20, and a first sealing element has an annular seal 21 of elastic material that is compressible by means of the union nut 20 for sealing, between opposite end faces 22 and 23.

The sample chamber 9 has the first opening 15. A sleeve 17 is arranged within the first opening 15. In the illustrated embodiment, the end face 22 is an end face or flange surface of a flange 40 of the sleeve 17. The end face 23 is a part or element associated with the detection system 6. When the union nut 20 is screwed to the external thread 19, the flange surface 22 or end face 22 of the sleeve 17 is pressed against the annular seal 21, resulting in a vacuum-tight connection. The union nut 20 engages a rear surface of the flange 40 of the sleeve 17.

A further annular seal 24 (belonging to a first sealing element of the connection system 16) is arranged between an inner surface of a region of the sample chamber wall 12 delimiting the first opening and an outer surface area 18 of the sleeve 17. The sleeve 17 is connectable to the detection system 6 by means of the union nut 20 screwed onto the external thread 19.

The detection beam path 14 passes through the sleeve 17 to impinge on a detector element 25 of the detection system 6 sensitive to the secondary radiation 7 and to be registered there with respect to its intensity. The entire detection beam path 14 as well as in particular the detection element 25 of the detection system are thereby evacuated from an ambient pressure, as is also the entire sample chamber or the interior of the sample chamber 9.

The transmission region 13 has an aperture angle α, which may lie between 0° and 165°, for example. The transmission region 13 seals the sample chamber 9 in a vacuum-tight manner but is permeable to X-radiation, i.e. exhibits relatively low absorption for X-radiation.

The device further comprises a sample holder receptacle 26. The sample holder receptacle 26 may be adjustable in height, i.e., adjustable in position along the Z-axis. The sample holder receptacle allows to hold a sample holder 27 at which or on which a sample 10 can be mounted or held.

The sample chamber 9 has a second opening 27 through which a fixed base component 31 and/or the sample holder receptacle 26 and/or a sample holder 27 extends at least partially. The goniometer arms 4 and 8 are pivotable relative to the base component 31, as well as relative to the sample holder receptacle 26.

Figure 3:
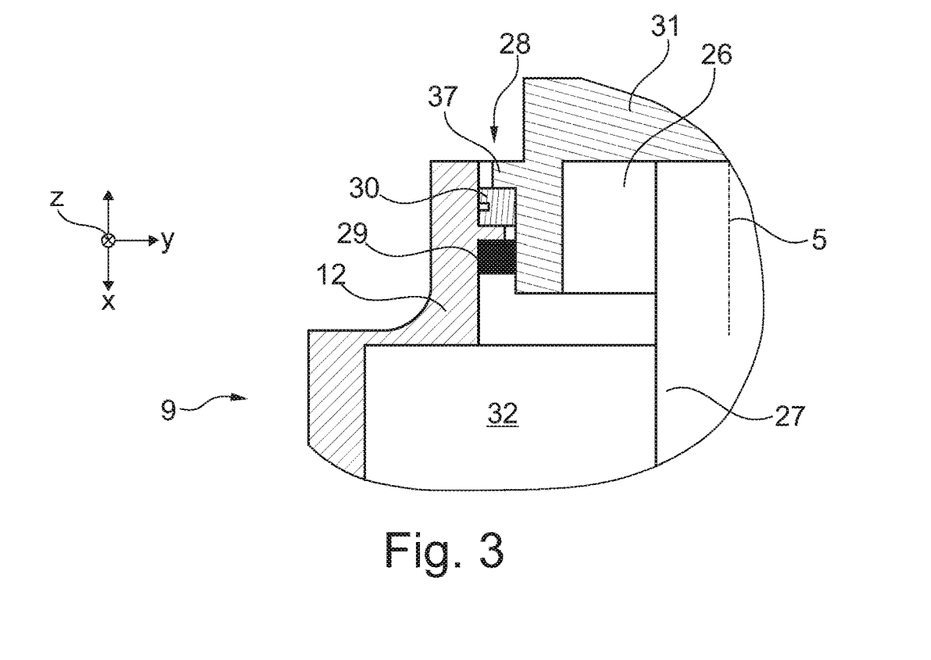
FIG. 3 schematically illustrates, in a sectional view, connecting elements for connecting a base component to the sample chamber.

FIG. 3 illustrates in a schematic sectional view of a cross-section through the XY plane a part of the sample chamber 9, which comprises the sample chamber wall 12, as well as a part of the base component 31, relative to which the sample chamber 9 is pivotable. A second sealing element 29 is arranged between an outer surface region of the base component 28 and an inner surface region of the sample chamber wall 12 delimiting the second opening 28 for sealing. The second sealing element 29 may, for example, comprise a lip seal.

Furthermore, a bearing 30 is provided which is configured to rotatably support the sample chamber 9 relative to the sample holder receptacle and/or the fixed base component 31. A sample chamber interior 32 in an interior of the sample chamber 9 is evacuable. However, the bearing 30 is disposed outside the sample chamber 9, i.e., outside the interior space 32 of the sample chamber 9, and is thus exposed to ambient pressure. The second sealing element 29 is thus arranged between the bearing 30 and the sample chamber interior 32.

A first actuator 33 (see FIGS. 1A to 2C) is configured to pivot the radiation generation system 2 by means of the first goniometer arm 4. A second actuator 34 is configured to pivot the detection system 6 together with the sample chamber 5 connected thereto by means of the second goniometer arm 8. Both actuators 33, 34 are arranged outside the sample chamber 9. By means of the actuator 33 and the first goniometer arm 4, the radiation generation system 2 is pivotable by up to between 60° and 82.5° to be able to set an angle of incidence θ_in this range as required.

Similarly, by pivoting the second goniometer arm 8 (by means of the second actuator 34), the detection system 6 may be pivoted by up to 60° and 82.5° to thus be able to set an angle of incidence θ_out in this range as required.

The sample chamber 9 and/or detection system 6 may include a vacuum port, not illustrated in detail, to which a vacuum pump may be connectable to generate a pressure of <30 mbar in the sample chamber interior 32.

The detection system 6 may comprise detection optics and/or a filter 35, which is illustrated, for example, in FIG. 4 and is arranged in the propagation direction of the secondary radiation 7 in front of the detection element 25 of the detection system 6. The filter 35 may thus be arranged at the fastening element 16 or, for example, also within the sleeve 17.

The device 1 further comprises a controller 36 that is communicatively connected to the radiation generation system 2, the first actuator 33, the detection system 6, the second actuator 34, and to an unillustrated vacuum pump for performing a measurement in order to transmit control signals and/or receive and evaluate measurement signals.

In the illustrated embodiment, the goniometer axis 5 extends in a horizontal direction.

The device illustrated in FIGS. 1A, 1B, 1C, 2A, 2B, 2C is manufactured according to a method of the present invention. In this process, the radiation generation system 2 is mounted on the first goniometer arm 4. Furthermore, the detection system 6 is mounted on the second goniometer arm 8. Furthermore, the evacuable sample chamber 9 is provided having a transmission region 13 that is transmissive to the primary radiation and vacuum-tight. Furthermore, the sample chamber is manufactured such that it has a first opening 15 in a detection beam path 14, at which the sample chamber and the detection system are connectable in a vacuum-tight manner, in particular by means of the connection system 16.

Embodiments of the present invention may include one or more of the following features:

1. X-ray diffraction Bragg-Brentano diffractometer (XRD) with an angular accuracy of $1/10000°$.
   a. In the diffractometer, the goniometer axis is horizontal. However, it is also possible to design the diffractometer with a vertical goniometer axis.
   b. It is also possible to convert the instrument for X-ray fluorescence analysis (XRF).
2. Unit goniometer with radiation source
   a. The radiation source is located outside the vacuum chamber on a goniometer arm.
   b. The X-ray source rotates during the measurement via the goniometer arm. Therefore, the vacuum chamber has a large window (approx. 160°) so that the radiation may impinge on the sample at the correct angle.
   c. The X-ray source may be a Cu—K(alpha) source, the anode material may also be Cr, Fe, Co, Cu, Mo, Ag
   d. The window is made of plastic or beryllium, wherein beryllium is avoided because beryllium compounds are toxic.
3. Sample
   a. The sample may be a powder, crystal or liquid in a capillary.
   b. The sample is placed in a vacuum chamber.
   c. The sample is positioned on the sample table at the position of the goniometer axis.
   d. The sample can be adjusted in height for more accurate positioning before measurement.
   e. During the measurement, the sample does not change position.
4. Unit goniometer with detector with vacuum chamber
   a. The detector goniometer arm is fixedly connected to the vacuum chamber via a detachable connection. This means that the detector is also fixedly connected to the vacuum chamber. If the detector goniometer rotates, the vacuum chamber also rotates.
   b. As a result, there is no window between the sample and the detector.
      Windows weaken or scatter the beam from the sample and increase the background signal, thus deteriorating the measurement signal. Window materials with low attenuation are problematic, e.g. beryllium is toxic.
   c. It is the vacuum chamber and the detector in the same vacuum. Air scatters or attenuates the beam, the less air, the better the signal. Vacuum chamber and detector are evacuated simultaneously (weak vacuum, 1-10 mbar).
   d. The vacuum port may be located at the vacuum chamber and/or at the detector.
   e. There are 2 ports (connections) for the vacuum, so the chamber may also be filled or purged with inert gas.
   f. The vacuum chamber is rotatably mounted (bearing diameter approx. 12 cm) and the bearing is vacuum-tight (sliding rotatable seal).
   g. Since the detector is also in a vacuum, the detector connections must be vacuum-tight.
   h. Because the goniometer also rotates the vacuum chamber, the goniometer and the goniometer drive are designed to be stronger (higher torque) than normal (there are special safety measures for this). This is also necessary to ensure the required precision.
   i. The detector is flanged to the vacuum chamber. This also allows the vacuum chamber to be removed if necessary for the measurement.
   j. The flange connection between the detector and the vacuum chamber is elastic so that small differences can be compensated.
   k. The detector is a 256×256 pixel detector, which is used as a point detector.

The device for examining a sample is constructed in a simple manner, and allows measurement over a wide angular range. No windows or air need to be present in the detection beam path between the sample and the detector, so that the signal from the sample is not unnecessarily attenuated. The detector goniometer can be mounted twice, once via the conventional goniometer bearing (without seal) and the second time via the bearing at the vacuum chamber (with rotatable lip seal). The detector or the detector-goniometer are connected to each other with a flange, this connection is configured in such a way that tolerances can be compensated. This connection is detachable and has a vacuum seal, which is subject to small movement. The actuator of the second goniometer arm 8 is configured to be stronger than conventional, since this second actuator 34 must also rotate the sample chamber or vacuum chamber 9.

Since there is no window between the sample and the detector in the invention, the beam stop can be omitted. Modern detectors are not damaged by the impinging primary X-ray beam and are partially capable of measuring the primary intensity. This enables better measurement results, since no scattering of beamstop influences the measurement result.

The vacuum-tight sample chamber may be rigidly connected to the vacuum-tight housing for the optics and the detection system. The vacuum-tight sample chamber may be supported on a vacuum rotary feedthrough (such as illustrated in FIG. 3). The vacuum rotary feedthrough may be located on a mounting flange 37 (e.g., part of the base component 31, see FIG. 3) arranged such that the vacuum rotary feedthrough is concentric with the goniometer axis 5.

If the pivoting angle of the detection system 6 is changed (change in θ_out), then the vacuum-tight sample chamber 9 rotates with it. The transmission region or entrance window 13 at the sample chamber 9 may, for example, cover as large an angular range as possible so that the measurable angular range is not restricted. In the detection beam path 14, which passes through the first opening 15 of the sample chamber, the fastening system 16 is provided to connect the vacuum-tight sample chamber 9 to the vacuum-tight optics housing of the detection system 6 in front of the optics. This ensures that there is no window or air gap behind the sample, which is located on the axis of the X-ray diffractometer. A filter 35 may also optionally be integrated in the fastening system 16 or the fastening element, for example to suppress or attenuate the Kβ radiation in a copper X-ray source by means of nickel foil.

The invention claimed is:

1. A device for examining a sample by means of X-radiation, comprising:
    a radiation generation system for generating primary radiation;
    a first goniometer arm on which the radiation generation system is mounted and which is pivotable about a goniometer axis;
    a detection system configured to detect secondary radiation emanating from the sample;
    a second goniometer arm on which the detection system is mounted and which is pivotable about the goniometer axis;
    an evacuable sample chamber within which the sample is arrangeable in a sample region encompassing a portion of the goniometer axis, the sample chamber being delimited by a sample chamber wall which has a transmission region that is transmissive to the primary radiation and vacuum-tight, in order to allow the primary radiation to penetrate into the sample chamber and to impinge on the sample region at different angles of incidence;
    wherein the sample chamber has a first opening in a detection beam path, at which the sample chamber and the detection system are connectable in a vacuum-tight manner, so that the detection beam path is evacuable,
    wherein the transmission region has an aperture angle of between 100° and 165°.

2. The device according to claim 1, further comprising:
    a connection system configured for releasably connecting the sample chamber to the detection system at the first opening in a vacuum-tight manner, wherein the connection system comprises at least a first sealing element.

3. The device according to claim 2, wherein the connection system comprises an external thread and a union nut, wherein the at least one first sealing element comprises an annular seal of elastic material, which is compressible by means of the union nut for sealing.

4. The device according to claim 3, wherein the connection system comprises a sleeve arranged within the first opening, wherein the at least one first sealing element comprises a further annular seal of elastic material arranged between an inner surface of a region of the sample chamber wall delimiting the first opening and an outer surface region of the sleeve.

5. The device according to claim 4,
    wherein the sample chamber has a second opening through which a fixed base component and/or the sample holder receptacle and/or the sample holder extends at least partially,
    wherein the device further comprises at least one second sealing element made of elastic material, which is arranged between an outer surface region of the base component and/or of the sample holder receptacle and/or of the sample holder and an inner surface region of the sample chamber wall delimiting the second opening for sealing.

6. The device according to claim 5, wherein the annular seal and/or the further annular seal of the at least one first sealing element and/or the second sealing element is concentrically arranged and circular and/or comprises at least one of the following:
    a lip seal,
    an O-ring,
    a shaft seal,
    a sliding ring.

7. The device according to claim 5, further comprising:
    a bearing configured to rotatably support the sample chamber relative to the sample holder receptacle and/or sample holder and/or a fixed base component, where the bearing is exposed to ambient pressure,
    wherein the second sealing element is arranged between the bearing and a sample chamber interior.

8. The device according to claim 1,
    wherein the transmission region is made of material transmissive to X-radiation.

9. The device according to claim 1, further comprising at least one of the following:
    a sample holder receptacle which is configured to receive a sample holder; and/or
    a sample holder supportable by means of the sample holder receptacle or a fixed base component and which is configured and arranged to hold the sample in the sample region.

10. The device according to claim 9, further comprising:
    a bearing configured to rotatably support the sample chamber relative to the sample holder receptacle and/or sample holder and/or a fixed base component, where the bearing is exposed to ambient pressure.

11. The device according to claim 1, further comprising:
    a first actuator configured to pivot the radiation generation system by means of the first goniometer arm;
    a second actuator configured to pivot the detection system together with the sample chamber connected thereto by means of the second goniometer arm, wherein the first actuator and/or the second actuator is arranged outside the sample chamber.

12. The device according to claim 1,
    wherein the radiation generation system is pivotable by means of pivoting the first goniometer arm by up to between 60° and 82.5 from a zero position(0°) and/or
    wherein the detection system is pivotable by means of pivoting the second goniometer arm by up to between 60° and 82.5° from a zero position(0°) opposite to a pivoting direction of the radiation generation system.

13. The device according to claim 1,
    wherein the radiation generation system is located outside the sample chamber and is exposed to ambient pressure, and/or
    wherein the radiation generation system comprises a radiation source and optics to generate the primary radiation having a predetermined wavelength range and/or a predetermined cross-sectional size.

14. The device according to claim 1, further comprising:
    at least one vacuum port on the sample chamber and/or on the detection system;

at least one vacuum pump configured to generate a pressure of less than 30 mbar within the sample chamber and/or the detection beam path.

15. The device according to claim 1,
wherein the detection system comprises detection optics and/or a filter and a detector,
wherein the filter is arranged in the detection beam path.

16. The device according to claim 1, wherein the detector of the detection system comprises a two-dimensional or three-dimensional array of detector elements used as a point detection system or a line detection system.

17. The device according to claim 1, further comprising:
a controller communicatively connected to the radiation generation system and/or the first actuator and/or the detection system and/or the second actuator and/or the vacuum pump for performing a measurement in order to transmit control signals and/or receive measurement signals.

18. The device according to claim 1, wherein the device is configured to perform at least one of the following measurement procedures:
X-ray diffraction (XRD),
X-ray fluorescence analysis (XRF),
small angle X-ray scattering (SAXS),
in each case in reflection and/or transmission, and/or
wherein the goniometer axis is substantially horizontal or vertical, and/or wherein the sample comprises a powder and/or a crystal and/or many crystals and/or a liquid, and is immobile during the measurement, and/or
wherein the sample chamber is substantially cylindrical.

19. An evacuable sample chamber for a device for examining a sample by means of X-radiation, comprising:
a sample chamber wall delimiting a sample chamber interior within which the sample is arrangeable in a sample region, the sample chamber wall having a transmission region transmissive to the X-radiation and vacuum-tight to allow the X-radiation to penetrate into the sample chamber and impinge on the sample region at different angles of incidence;
a first opening in a detection beam path, in which the sample chamber and a detection system are connectable in a vacuum-tight manner so that the detection beam path is evacuable;
a second opening;
wherein the transmission region has an aperture angle of between 100° to 165°.

20. The evacuable sample chamber according to claim 19, further comprising at least one of the following:
wherein the sample chamber and the detection system are connectable in a vacuum-tight manner by means of a connection system having a first sealing element; and/or
wherein the evacuable sample chamber further comprises a second sealing element which is arrangeable for sealing at an inner surface region of the sample chamber wall delimiting the second opening; and/or
wherein the transmission region is formed as a segment of a cylindrical surface.

* * * * *